United States Patent
Cahill

(10) Patent No.: US 10,737,669 B2
(45) Date of Patent: Aug. 11, 2020

(54) INDEPENDENT BRAKE CONTROL OF A COMMON AIRCRAFT GEAR

(71) Applicant: Goodrich Corporation, Charlotte, NC (US)

(72) Inventor: Eric D. Cahill, Troy, MI (US)

(73) Assignee: Goodrich Corporation, Charlotte, NC (US)

( * ) Notice: Subject to any disclaimer, the term of this patent is extended or adjusted under 35 U.S.C. 154(b) by 105 days.

(21) Appl. No.: 15/945,174

(22) Filed: Apr. 4, 2018

(65) Prior Publication Data

US 2018/0222457 A1    Aug. 9, 2018

Related U.S. Application Data

(62) Division of application No. 14/921,221, filed on Oct. 23, 2015, now abandoned, which is a division of application No. 12/594,340, filed as application No. PCT/US2008/063366 on May 12, 2008, now Pat. No. 9,199,615.

(60) Provisional application No. 60/939,056, filed on May 19, 2007.

(51) Int. Cl.
   *B60T 8/17*    (2006.01)
   *B64C 25/44*   (2006.01)

(52) U.S. Cl.
   CPC ............ *B60T 8/1703* (2013.01); *B64C 25/44* (2013.01)

(58) Field of Classification Search
   CPC ....... B64C 25/44; B64C 25/42; B60T 8/1703; B60T 8/885; B60T 2270/414; Y10S 303/09

USPC ............... 244/111; 303/3, 9.61, 20, 122.04, 303/122.09, 126, 132, 135, 191; 701/3, 701/16, 70, 71
   See application file for complete search history.

(56) References Cited

U.S. PATENT DOCUMENTS 4,685,745 A * 8/1987 Reinecke .............. B60T 8/1708
                                                      303/112
5,172,960 A   12/1992 Chareire
(Continued)

FOREIGN PATENT DOCUMENTS

| EP | 1547918 | 6/2005 |
|----|---------|--------|
| WO | 0069721 | 11/2000 |
| WO | 2008144267 | 11/2008 |

OTHER PUBLICATIONS

International Search Report dated Nov. 12, 2008 in Application No. PCT/US2008/063366.
(Continued)

*Primary Examiner* — Stephen Holwerda
(74) *Attorney, Agent, or Firm* — Snell & Wilmer L.L.P.

(57) ABSTRACT

A brake control system for a landing gear of an aircraft is provided. The system includes a first control channel for providing brake control signals to one or more brakes on the landing gear, and a second control channel for providing brake control signals to another one or more brakes on the landing gear. At least one of the first control channel and the second control channel is configured to act as an executive in monitoring braking efforts applied by the one or more brakes as compared to braking efforts applied by the another one or more brake, and to cause the braking efforts of at least one of the one or more brakes or the another one or more brakes to be modified in an effort to equalize the braking efforts.

11 Claims, 5 Drawing Sheets

(56) References Cited

U.S. PATENT DOCUMENTS

| | | | |
|---|---|---|---|
| 5,180,214 A * | 1/1993 | Yeh | B60T 8/1703 |
| | | | 303/126 |
| 5,312,168 A | 5/1994 | Breen | |
| 5,393,131 A | 2/1995 | Nomura | |
| 5,470,134 A * | 11/1995 | Toepfer | B60T 8/1764 |
| | | | 188/1.11 L |
| 5,752,747 A * | 5/1998 | Decker | B60T 8/266 |
| | | | 303/113.4 |
| 6,257,681 B1 | 7/2001 | Bartram | |
| 6,296,325 B1 | 10/2001 | Corio et al. | |
| 6,317,675 B1 * | 11/2001 | Stolzl | B60T 7/042 |
| | | | 303/155 |
| 6,851,649 B1 | 2/2005 | Radford | |
| 2003/0111895 A1 | 6/2003 | Salamat | |
| 2005/0127749 A1 | 6/2005 | Hartmann | |
| 2005/0231031 A1* | 10/2005 | Bellouard | B64C 25/48 |
| | | | 303/126 |
| 2008/0149436 A1 | 6/2008 | Griffith | |

OTHER PUBLICATIONS

Initial Publication without International Search Report for PCT/US2008/063366, dated Nov. 27, 2008.
International Preliminary Report on Patentability dated Aug. 27, 2009 in Application No. PCT/US2008/063366.
International Preliminary Report on Patentability for PCT/US2008/063366, dated Nov. 19, 2009.
Written Opinion for PCT/US2008/063366, dated Nov. 19, 2009.
International Search Report for PCT/US2008/063366, dated Feb. 05, 2009.
EP; Examination Report dated Apr. 29, 2010 in Application No. 08825918.9.
USPTO, Restriction/Election Office Action dated Oct. 25, 2012 in U.S. Appl. No. 12/594,340.
USPTO, Non Final Office Action dated Feb. 8, 2013 in U.S. Appl. No. 12/594,340.
USPTO, Final Office Action dated May 24, 2013 in U.S. Appl. No. 12/594,340.
USPTO, Advisory Action dated Aug. 8, 2013 in U.S. Appl. No. 12/594,340.
USPTO, Non Final Office Action dated Mar. 26, 2014 in U.S. Appl. No. 12/594,340.
USPTO, Final Office Action dated Sep. 18, 2014 in U.S. Appl. No. 12/594,340.
Examination Report dated Nov. 3, 2014 in European Application No. 08825918.9.
USPTO, Advisory Action dated Dec. 2, 2014 in U.S. Appl. No. 12/594,340.
USPTO, Non Final Office Action dated Jun. 5, 2015 in U.S. Appl. No. 12/594,340.
European Patent Office, European Intent to Grant dated Jul. 10, 2015 in U.S. Appl. No. 12/594,340.
USPTO, Notice of Allowance dated Oct. 2, 2015 in U.S. Appl. No. 12/594,340.
European Patent Office, European Decision to Grant dated Mar. 3, 2016 in Application No. 08825918.9-1756.
USPTO, Non Final Office Action dated Oct. 19, 2016 in U.S. Appl. No. 14/921,221.
USPTO, Final Office Action dated Mar. 22, 2017 in U.S. Appl. No. 14/921,221.
USPTO, Advisory Action dated Jun. 9, 2017 in U.S. Appl. No. 14/921,221.
USPTO, Non Final Office Action dated Aug. 11, 2017 in U.S. Appl. No. 14/921,221.
USPTO, Final Office Adction dated Dec. 5, 2017 in U.S. Appl. No. 14/921,221.
USPTO, Advisory Action dated Feb. 15, 2018 in U.S. Appl. No. 14/921,221.

* cited by examiner

INDEPENDENT BRAKE CONTROL OF A COMMON AIRCRAFT GEAR

CROSS-REFERENCE TO RELATED APPLICATIONS

This application is a divisional of, claims priority to and the benefit of, U.S. Ser. No. 14/921,221 filed Oct. 23, 2015 and entitled "INDEPENDENT BRAKE CONTROL OF A COMMON AIRCRAFT GEAR." The '221 application is a divisional of, claims priority to and the benefit of, U.S. Ser. No. 12/594,340 filed on Oct. 1, 2009 and entitled "INDEPENDENT BRAKE CONTROL OF A COMMON AIRCRAFT GEAR" which issued as U.S. Pat. No. 9,199,615 on Dec. 1, 2015. The '340 application is a U.S. national phase filing under 35 U.S.C. § 371 of PCT/US2008/063366 filed on May 12, 2008 and entitled "INDEPENDENT BRAKE CONTROL OF A COMMON AIRCRAFT GEAR," which claims priority from U.S. Provisional Application No. 60/939,056 filed on May 19, 2007 and entitled "INDEPENDENT BRAKE CONTROL OF A COMMON AIRCRAFT GEAR." All the aforementioned applications are incorporated herein by reference in their entirety.

FIELD OF INVENTION

The present invention relates generally to brake control systems, and more particularly to a system, device and method for controlling multiple brakes on a given gear of an aircraft.

BACKGROUND OF THE INVENTION

Aircraft brake control systems are known in the art. These brake control systems function to provide brake control to brakes on the landing gear of the aircraft. The brakes exert a braking force on the wheels of the gear in order to slow the aircraft during taxiing, landing, rejected take-off, etc.

For reasons such as system redundancy and/or robustness, a brake control system may include multiple brake control channels controlling respective brakes on a given gear. The multiple brake control channels may serve to control respective brakes (e.g., respective brake actuators) on a given wheel of the landing gear. In addition, or in the alternative, multiple brake control channels may serve to control the brake(s) on respective wheels.

Problems can arise, however, with the use of multiple brake control channels. Because the different channels control different brakes on a given gear, the amount of braking delivered by the respective brakes may not be equal, i.e., one brake may be doing very little braking while the other brake is doing most of the work. Additionally, it is possible that two independent control channels could control the brakes in a way that causes dynamic instability—like twisting the gear when the brake applications get out of phase.

In view of the aforementioned shortcomings associated with conventional brake control systems, there is a strong need in the art for a brake control system, device and method for maintaining substantially equal workloads between the brakes controlled by the respective brake control channels. Moreover, there is a strong need in the art for a brake control system and method for avoiding dynamic instability.

SUMMARY OF THE INVENTION

According to one aspect of the present invention, a brake control system for a landing gear of an aircraft is provided. The system includes a first control channel for providing brake control signals to one or more brakes on the landing gear, and a second control channel for providing brake control signals to another one or more brakes on the landing gear. At least one of the first control channel and the second control channel is configured to act as an executive in monitoring braking efforts applied by the one or more brakes as compared to braking efforts applied by the another one or more brake, and to cause the braking efforts of at least one of the one or more brakes or the another one or more brakes to be modified in an effort to equalize the braking efforts.

The braking efforts can be modified by the system in an effort to equalize them with respect to applied braking force. For example, the control channel configured to act as the executive can be configured to increase the brake control signal provided to one of the one or more brakes and the another one or more brakes, and to decrease the brake control signal provided to the other of the one or more brakes and the another one or more brakes.

The braking efforts also can be modified in an effort to be equalized with respect to phase. For example, the control channel configured to act as the executive can be configured to increase or decrease a brake timing signal provided to one of the one or more brakes and the another one or more brakes relative to a brake timing signal provided to the other of the one or more brakes and the another one or more brakes.

The brake control system can further include a first communication interface configured to exchange information between the first control channel and the second control channel. The control system also may include a second communication interface configured to exchange information between electronics of the aircraft and at least one of the first or second control channel.

The brake control system may include a plurality of sensors, wherein each sensor of the plurality of sensors corresponds to one brake of the one or more brakes or one brake of the another one or more brakes, and each sensor is operative to provide data indicative of the braking effort provided by the corresponding brake. The plurality of sensors can include at least one of a speed sensor operative to detect a speed of a wheel, a force sensor operative to detect a force applied by the brake, and a torque sensor operative to detect a braking torque effected by the brake.

The brake control system may also include the landing gear, the one or more brakes, and the another one or more brakes. The one or more brakes can correspond to an inner bank or outer bank on the landing gear, and the another one or more brakes corresponds to the other of the inner bank or the outer bank on the landing gear. The one or more brakes can include a left inner bank (IB) brake and a right IB brake, and the another one or more brakes can include a left outer bank (OB) brake and a right OB brake.

According to another aspect of the invention, a brake controller, braking method, and braking program for controlling one or more brakes and another one or more brakes of a vehicle are provided. The brake controller includes a first control channel for providing brake control signals to the one or more brakes, and a second control channel for providing brake control signals to the another one or more brakes. At least one of the first control channel and the second control channel is configured to act as an executive in monitoring braking efforts applied by the one or more brakes as compared to braking efforts applied by the another one or more brakes, and to modify the first and/or second brake control signals so as to cause the braking efforts of the one or more brakes and the another one or more brakes to equalize.

The brake controller or method can modify brake control signals so as to equalize an applied braking force between the one or more brakes and the another one or more brakes. For example, the control channel configured to act as the executive can be configured to increase the brake control signal provided to one of the one or more brakes and the another one or more brakes, and to decrease the brake control signal provided to the other of the one or more brakes and the another one or more brakes.

The brake controller or method can modify the brake control signals so as to equalize a braking phase between the one or more brakes and the another one or more brakes. For example, the control channel configured to act as the executive is operative to increase or decrease a brake timing signal provided to one of the one or more brakes and the another one or more brakes relative to a brake timing signal provided to the other of the one or more brakes and the another one or more brakes.

The brake controller may include a first communication interface configured to exchange information between the first control channel and the second control channel. The brake controller may also include a second communication interface configured to exchange information between devices external to the controller and at least one of the first or second control channel.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

Figure 1:
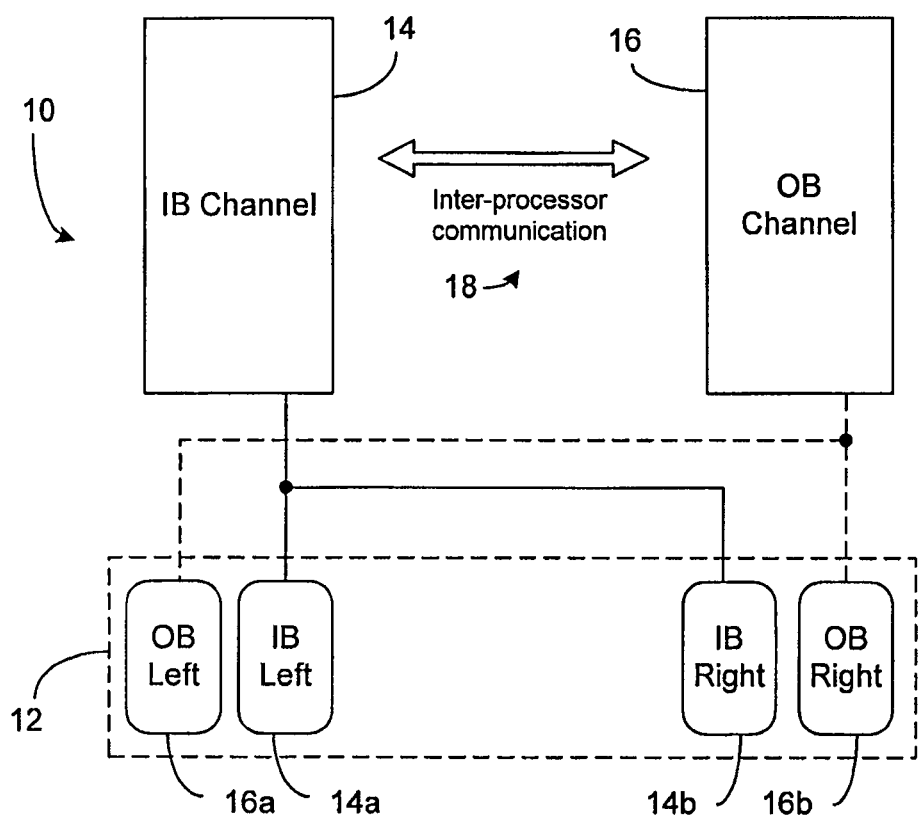
FIG. 1 is a simplified block diagram illustrating an exemplary architecture of a brake control system in accordance with the invention.

The present invention will now be described with reference to the drawings, wherein like reference numerals are used to refer to like elements throughout. Because the invention was conceived and developed for use in an aircraft braking system, it will be herein described chiefly in this context. However, the principles of the invention in their broader aspects can be adapted to other types of braking systems.

Referring to FIG. 1, the general architecture of a brake control system 10 is shown in accordance with an exemplary embodiment of the present invention. The brake control system 10 serves to control the brakes on a landing gear 12, for example. The landing gear 12 includes an inner bank (IB) left brake 14a and outer bank (OB) left brake 16a on a left side of the landing gear 12, and an IB right brake 14b and OB right brake 16b on the right side of the landing gear 12. The IB left Brake 14a and the OB left brake 16a may serve to apply braking to a same wheel or different respective wheels on the left side of the landing gear as will be appreciated. Similarly, the IB right brake 14b and the OB right brake 16b may serve to apply braking to the same wheel or different respective wheels on the right side of the landing gear 12.

The brake control system 10 includes a first, or IB, brake control channel 14, and a second, or OB brake control channel 16. As used herein, a brake control channel refers to a controller or the like that controls the operation of at least one brake. Such brake control channel may include a processor and memory, and code or the like stored in memory and executable by the processor so as to implement a braking function as described herein. Alternatively, the brake control channel may be configured as a hardware circuit (e.g., as an ASIC). The brake control channel also may include appropriate circuitry (e.g., analog and digital I/O) for interfacing with the brakes and associated components.

The IB channel 14 issues brake control signals to the IB left brake 14a and the IB right brake 14b within the landing gear 12 as represented in solid line. The OB channel 16 issues brake control signals to the OB left brake 16a and OB right brake 16b within the landing gear 12 as represented in dashed line. The brake control signals may be provided to the respective brakes as analog signals (e.g., via analog outputs from the respective brake control channel) or as digital signals (e.g., via a high speed communication link between each brake control channel and the respective brakes). In the exemplary embodiment, the OB channel and IB channel are substantially independent of one another.

In accordance with the present invention, the brake control system 10 further includes an inter-processor communication interface 18 between the IB channel 14 and OB channel 16. The inter-processor communication interface 18 may include a high-speed communication link, for example, wherein the respective channels can communicate with one another so as to share information. Processors (FIG. 2) in the respective channels are configured in accordance with the present invention so as to share information between the respective brake control channels in order to achieve equal and stable braking.

According to an exemplary embodiment, one channel (e.g., OB channel 16) acts as an executive (e.g., a master or lead section) and evaluates the braking effort being applied by the brakes of both respective channels (e.g., OB channel 16 and IB channel 14), and the corresponding deceleration. The other channel acts as a non-executive (e.g., a slave or follower section) and follows instructions from the executive section.

For example, the OB channel 16 may serve as the executive. The OB channel 16 monitors the braking effort applied by the OB left brake 16a and the OB right brake 16b (e.g., by the particular values of the brake control signals delivered to the brakes, force or torque sensors included in the OB left and OB right brakes and/or landing gear, etc.). Further, deceleration of the aircraft may be determined using wheel speed sensors on the wheels, etc.

The IB channel 14 monitors the braking effort applied by the IB left brake 14a and the IB right brake 14b, deceleration, etc., in the same manner in which the OB channel 16 does the OB left and OB right brakes. The IB channel 14 in turn shares such information with the OB channel 16 via the inter-processor communication interface 18. Serving as executive, the OB channel 16 compares the braking effort being applied by each of the channels and the corresponding deceleration. In the event the executive determines that the workload (i.e., braking force) being exerted by the brakes of the respective channels is not nearly equally shared, the executive OB channel 16 may request changes in the braking effort of each of the channels in order to assure nearly equal sharing of the workload among brake control channels.

Thus, for example, if the executive OB channel 16 determines that the OB left and/or OB right brakes 16a and 16b are bearing a larger portion of the workload as compared to the corresponding IB left and/or IB right brakes 14a and 14b, the OB channel 16 may cause the OB left and/or OB right brakes 16a and 16b to reduce their applied brake force by X percent. At the same time, the OB channel 16 may instruct the IB channel 14 via the inter-processor communication interface 18 to increase the brake force applied by the IB left and/or IB right brakes 14a and 14b by a corresponding percentage. Similarly, if the executive OB channel 16 determines that the OB left and/or OB right brakes 16a and 16b are bearing a smaller portion of the workload as compared to the corresponding IB left and/or IB right brakes 14a and 14b, the OB channel 16 may cause the OB left and/or OB right brakes to increase their applied brake force by X percent. At the same time, the OB channel 16 instructs the IB channel 14 via the inter-processor communication interface 18 to decrease the brake force applied by the IB left and/or IB right brakes by a corresponding percentage. In this manner, the executive channel can ensure sharing of the workload between the brakes of the respective brake control channels.

The executive channel may also serve to ensure dynamic stability. For example, again it is assumed that the OB channel 16 is serving as the executive (although it will be appreciated that the IB channel 14 could serve as the executive equally as well). As described above, the OB channel 16 monitors the brake efforts of the IB channel and OB channel brakes. In addition, the OB channel 16 determines if an out of phase braking effort oscillation exists. For example, the OB channel 16 compares the phase of the brake applications by the OB left and/or OB right brakes 16a and 16b to the phase of that of the IB left and/or IB right brakes 14a and 14b (again as communicated via the inter-processor communication interface).

If the OB channel 16, as executive, determines that the brake applications of the respective channels are out of phase by more than a predefined amount, the OB channel 16 takes corrective action. For example, the OB channel 16 can modify the application of the OB left and/or OB right brakes 16a and 16b so as to be in phase with that of the IB left and/or IB right brakes 14a and 14b. Alternatively, the OB channel 16 can instruct the IB channel 14 via the inter-processor communication interface 18 to modify the phase of the application of the IB left and/or IB right brakes 14a and 14b by an amount intended to bring them into phase with the corresponding OB left and/or OB right brakes 16a and 16b.

Figure 2:
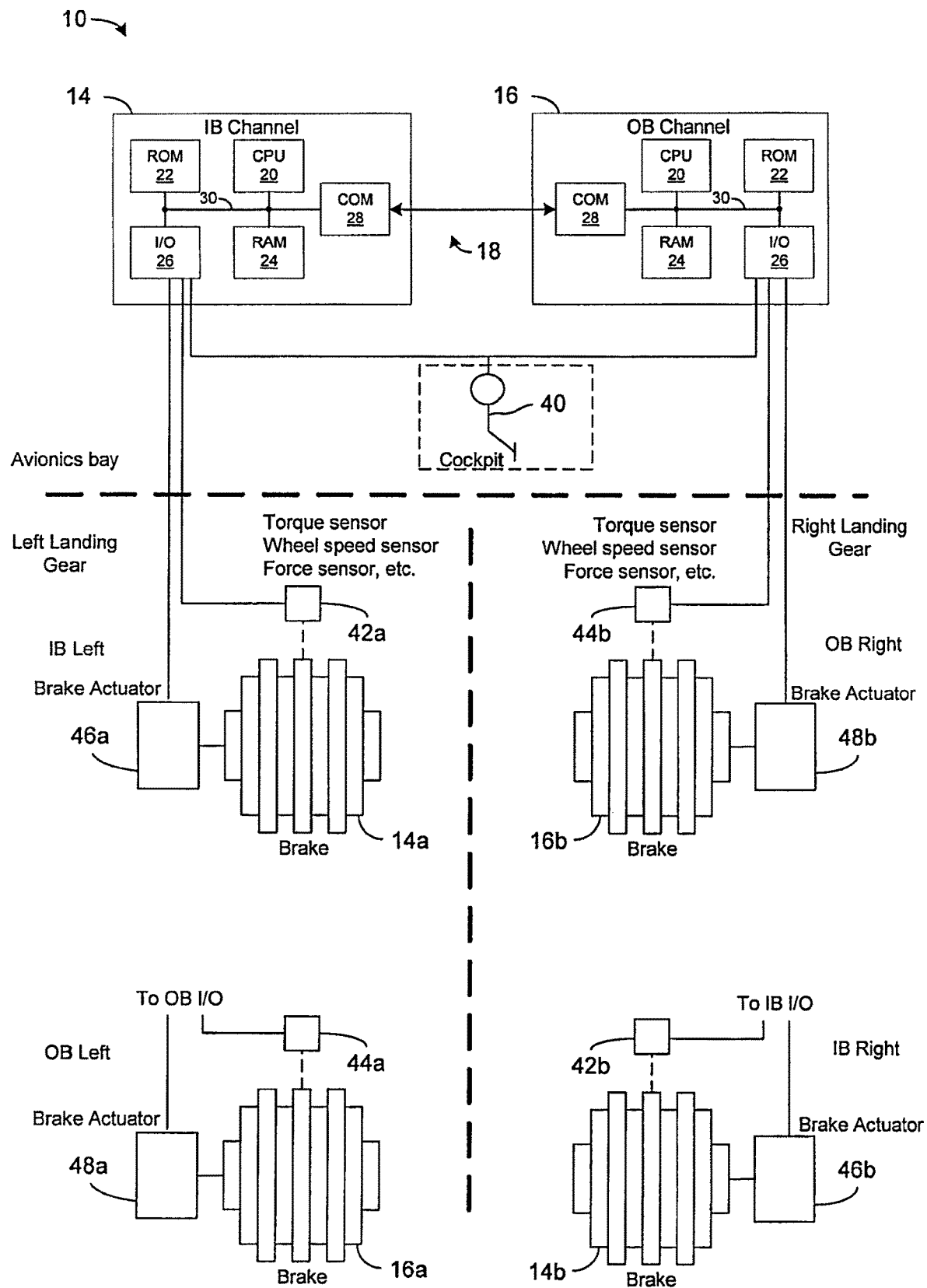
FIG. 2 is a schematic diagram illustrating an exemplary aircraft brake control system in accordance with the invention.

Moving to FIG. 2, the brake control system 10 in accordance with the invention is shown in more detail. As discussed above, the brake control system 10 includes the aforementioned IB and OB channels 14 and 16, wherein in a preferred embodiment each channel 14 and 16 includes a central processing unit (CPU) 20, read only memory (ROM) 22 (e.g., an EPROM, flash memory, etc.) and random access memory (RAM) 24. The CPU 20, in conjunction with the ROM 22 and RAM 24, is operable to execute instructions stored in ROM (e.g., a braking program) that causes the CPU to implement a braking function as described herein.

Each channel 14 and 16 also can include an input/output (I/O) module 26 for inputting and outputting data to/from the channel, as described below. The I/O module may include both digital and analog I/O, as well has a high speed communication interface (e.g., a high speed serial communication interface). Further, each channel 14 and 16 includes a high speed communication module 28 to implement the inter-processor communications 18. The high speed communication module 28 may comprise a direct link between the channels (e.g., a shared bus or the like) or it may comprise a high speed serial interface (preferably a time-deterministic interface). The CPU 20, ROM 22, RAM 24, I/O 26 and high speed communication interface 28 all may be communicatively coupled to each other via a system bus 30 or the like.

A brake pedal 40 located in the cockpit, for example, generates a braking signal proportional to an amount of pedal deflection or desired braking force. The signal generated by the brake pedal 40 is provided to the I/O module 26 of the IB and OB channels 14 and 16. Further, left and right IB and OB sensors 42a, 42b, 44a and 44b, which may be arranged on the landing gear 12 and/or on respective left and right IB and OB brakes 14a, 14b, 16a and 16b, also provide data to the corresponding OB or IB channel 14 and 16 via the respective I/O modules 26. The sensors 42a, 42b, 44a and 44b, for example, may be i) wheel speed sensors (e.g., encoders or the like) that detect a rotational velocity of each wheel, ii) force sensors that detect a force applied by the brakes 14a, 14b, 16a and 16b, and/or iii) torque sensors that detect a braking torque effected by the brakes (e.g., a torque applied to a torque tube of each wheel). As noted above, the respective signals generated by the brake pedal 40 and sensors 42a, 42b, 44a and 44b may be conventional analog and/or digital signals.

The IB channel 14, via its I/O module 26, is operatively coupled to a left IB and a right IB brake actuator 46a and 46b of the corresponding left and right IB brakes 14a and 14b. The OB channel 16, via its I/O module 26, is operatively coupled to a left OB and a right OB brake actuator 48ab and 48b of the corresponding left and right OB brakes 16a and 16b. The brake actuators, for example, may be one or more hydraulic valves, electric motors, or the like. Based on a braking command from the pedal 40 and wheel/brake data as detected by the sensors 42a, 42b, 44a and 44b, the IB channel 14 provides signals to the IB brake actuators 46a and 46b and the OB channel 16 provides signals to the OB brake actuators 48a and 48b so as cause the braking effort of at least one of the one or more brakes or the another one or more brakes to be modified so as to equalize the braking efforts, as described in more detail below with respect to FIGS. 3 and 4.

Figure 3:
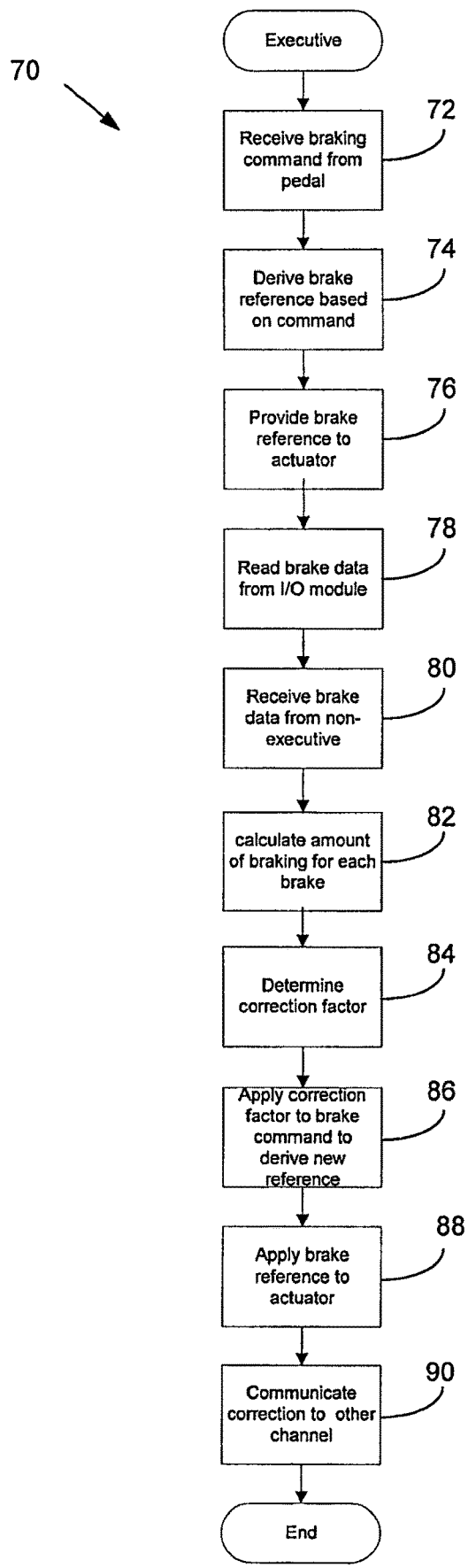
FIG. 3 is a flow chart illustrating exemplary steps for implementing braking for an executive channel in accordance with the invention.
Figure 4:
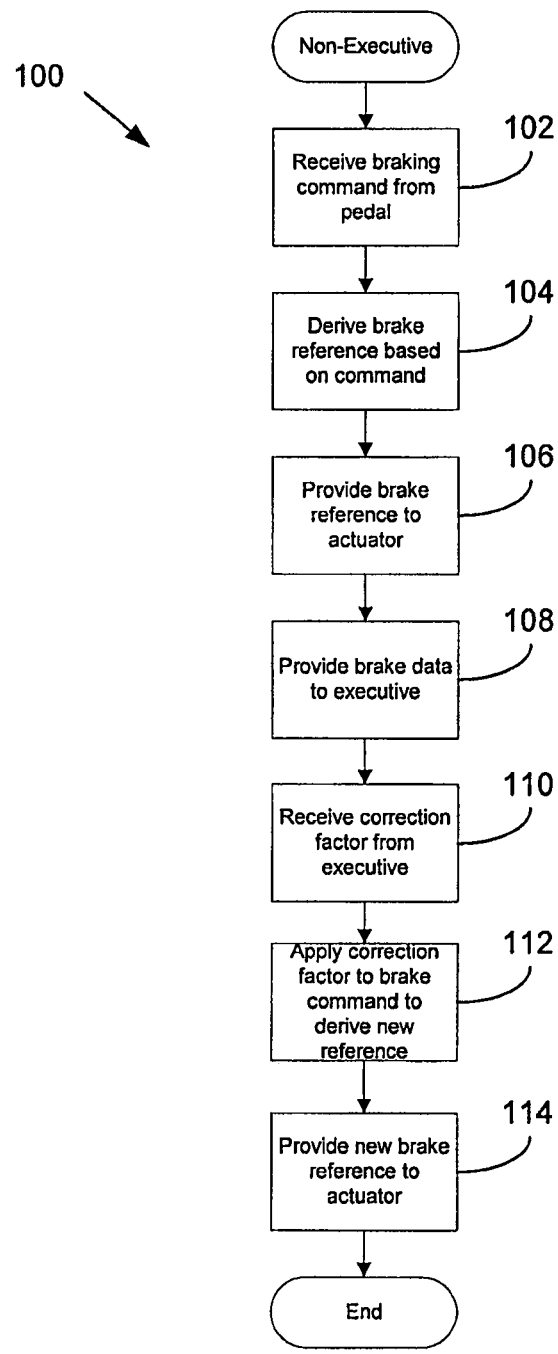
FIG. 4 is a flow chart illustrating exemplary steps for implementing braking for a non-executive channel in accordance with the invention.

Referring now to FIGS. 3 and 4, two flow diagrams 70 and 100 illustrating exemplary methods for implementing braking control as described herein are provided. FIG. 3 illustrates exemplary steps that may be implemented by an executive channel (e.g., the OB channel 16) of the brake controller 10, while FIG. 4 illustrates exemplary steps that may be implemented by a non-executive channel (e.g., the IB channel 14) of the brake controller 10. The flow diagrams include a number of process blocks arranged in a particular order. As should be appreciated, many alternatives and equivalents to the illustrated steps may exist and such alternatives and equivalents are intended to fall with the scope of the claims appended hereto. Alternatives may involve carrying out additional steps or actions not specifically recited and/or shown, carrying out steps or actions in a different order from that recited and/or shown, and/or omitting recited and/or shown steps. Alternatives also include carrying out steps or actions concurrently or with partial concurrence.

Beginning with the steps associated with the executive channel as shown in FIG. 3, the CPU 20 of the executive channel (e.g., the OB channel 16), via the I/O module 26, receives a brake command signal (i.e., the actual braking request) from the pedal 40 as indicated at block 72. The brake command signal, which may in analog or digital form, is indicative of a requested braking force to be applied by the brakes. Due to non-linearities in the braking system as well as other factors, there may not be a one-to-one relationship between the brake command signal and the braking force applied by the brakes. To resolve these possible issues, at block 74 a brake reference signal (i.e., the signal applied to the actuators) is derived based on the brake command signal as provided from the pedal 40. In deriving the brake reference signal, the CPU 20, for example, may condition (e.g., scale, filter, offset, etc.) the brake command signal so as to achieve an actual braking response that follows the brake command signal. Once the brake reference signal has been generated, then at block 76 the brake reference signal is provided to the left and right OB brake actuators 48a and 48b, which cause the left and right OB brakes 16a and 16b, respectively, to apply a braking force corresponding to the brake command signal.

At block 78, the OB channel 16 reads the left and right OB braking data as received by the I/O module 26. In particular, the OB channel 16 receives data corresponding to wheel speed, braking force and/or braking toque for the OB wheels and/or brakes 16a and 16b. Similarly, at block 80 the OB channel 16 receives brake data from the IB channel 14, wherein the brake data from the IB channel corresponds to wheel speed, braking force and/or braking torque for the IB wheels and/or brakes 14a and 14b. Then at block 82, the OB channel 16 analyzes the data to determine an amount of braking being performed by the respective brakes 14a, 14b, 16a and 16c and/or if the IB and OB brakes are in phase.

For example, the OB channel can calculate a braking effort of each brake based on the measured torque at each wheel's torque tube. Alternatively, the braking effort of each brake can be calculated based on a deceleration rate of each wheel (as determined from the respective wheel speed sensors) in conjunction with a braking force applied by each brake.

At block 84, the OB channel 16 determines a correction factor, if any, that should be applied to the IB brakes and/or OB brakes. This correction factor can correspond to the difference in braking effort as determined at block 82. For example, if it is determined that the OB brakes 16a and 16b are performing 40 percent of the total braking load and the IB brakes 14a and 14b are performing 60 percent of the total braking load, then the force applied by the OB brakes should be increased and the force applied by the IB brakes should be decreased. More specifically, the braking force applied by the IB brakes 14a and 14b can be decreased by 10 percent, and the braking force applied by the OB brakes 16a and 16b can be increased by 10 percent, such that the entire braking load is shared evenly between the IB and OB brakes.

Alternatively, the correction factor may be based on the phasing of the IB and OB brakes. Phasing of the brakes, as used herein, refers to the time the IB brakes are activated relative to the time the OB brakes are activated. If the brakes are activated at the same time (either continuously or periodically) the brakes are said to be in phase. If the IB and OB brakes are not activated at the same time, then the brakes are said to be out of phase. By monitoring the application of the brakes, it can be determined if an out of phase oscillation exists, which could lead to instability. This out of phase condition then can be corrected by altering the timing of the applied braking force.

For example, a correction factor can be generated that modifies the application of the OB left and/or OB right brakes 16a and 16b so as to place them in phase with the IB left and/or IB right brakes 14a and 14b. Alternatively, a correction factor can be generated that modifies the application of the IB left and/or IB right brakes 14a and 14b so as to place them in phase with the OB left and/or OB right brakes 16a and 16b.

Once the correction factor is determined, then at block 86 it is applied to the brake reference signal for the OB brakes 16a and 16b, which generates a new reference signal. At block 88, the new reference signal is provided to the OB brake actuators 48a and 48b, which alter the braking force applied by brakes 16a and 16b and/or the timing of brake actuation. At block 90, the correction factor for the IB brakes 14a and 14b is communicated to the IB channel 14 via the communication modules 28, and the method of FIG. 3 ends.

Executed concurrently with the steps of FIG. 3 are the steps of FIG. 4, which pertain to the non-executive channel. Blocks 102, 104 and 106 of FIG. 4 correspond to blocks 72, 74 and 76 of FIG. 3, except that the operations are performed by the IB channel (instead of the OB channel) for controlling the IB brakes 14a and 14b. Thus, the IB channel 14 receives the braking command signal from the pedal 40, derives a brake reference signal based on the command signal, and provides the reference signal to the IB brake actuators 14a and 14b in a manner consistent with the OB channel as described above.

At block 108, the IB channel 14 reads the I/O module 26 to obtain brake data as collected by the sensors 42a and 42b, and forwards this data to the OB channel 16 via the communication module 28. As noted above, the OB channel uses this data to compare the braking effort and/or phasing of the brakes, and based on this comparison determines a correction factor to be applied to the IB and OB brakes so as to equalized braking effort.

At block 110 the IB channel 14, via the communication module 28, receives a correction factor from the OB channel 17 and applies this correction factor to the brake reference signal as generated at block 104. The received correction signal may be in the form of a multiplier or the like, and/or may include timing data that can be used to alter when the IB brakes 14a and 14b are actuated (thereby allowing the phase between the IB and OB brakes to be altered). At block 112, the received correction factor is applied to the brake reference signal as derived at block 104 to arrive at a new brake reference signal. At block 114, this new brake reference signal then is applied to the IB brake actuators 46a and 46b to effect a braking function.

For example, the correction factor as received from the OB channel 16 may be expressed as a percentage (e.g., in percent*10). Thus, a value of 100 would signify a requested change of 10.0 percent. If the brake reference signal as generated at block 104 is 2000 counts (assuming 12-bit resolution), then the IB channel will increase the brake reference signal from 2000 counts to 2200 counts (2000+10 percent of 2000). This change in signal may be ramped so as to minimize any shock introduced into the system. To decrease the brake reference by 10 percent, for example, the correction factor may be represented as −100.

In the case of altering the phase of the IB brakes relative to the OB brakes, the correction factor received from the OB channel 16 may be expressed in time (e.g., in seconds*100). Thus, a value of 10 would signify a phase change of 0.1 seconds. Using this information, the IB controller can advance the phasing of the IB brakes 16*a* and 16*b* by 0.1 seconds. To retard the phase by 0.1 seconds, the correction factor may be represented as −10, for example.

Figure 5:
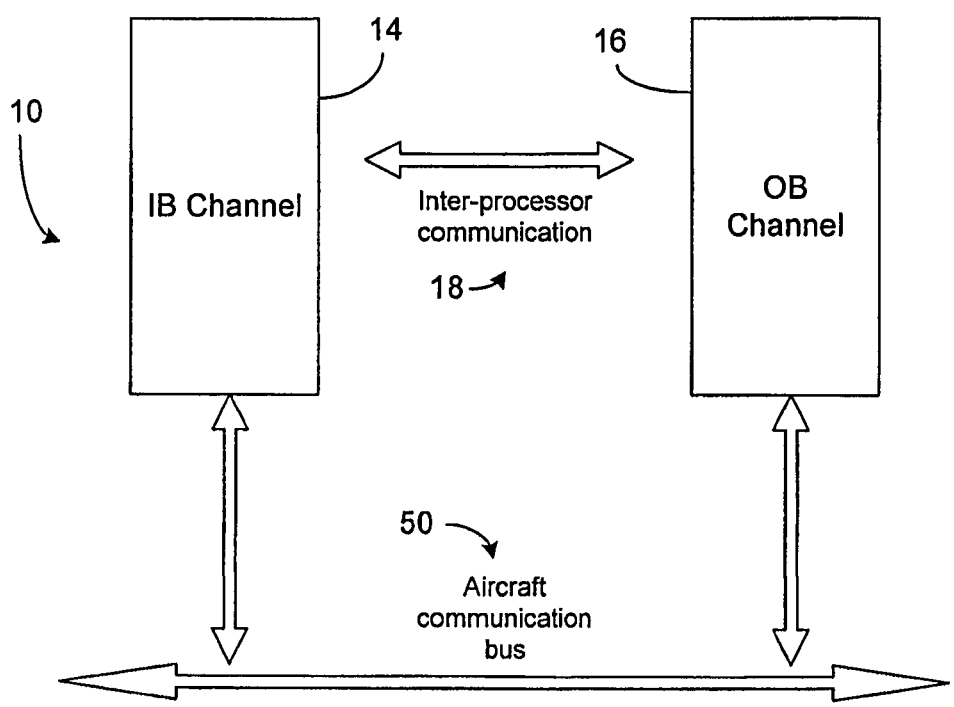
FIG. 5 is a block diagram illustrating use of the inter-processor communication interface and the aircraft's communication bus to exchange data.

In accordance with another aspect of the invention, the inter-communication processor interface 18 can be used to share signals received from the aircraft. For example, I/O (e.g., discrete inputs corresponding to throttle position and/or digital signals corresponding to the value of the throttle position) can be communicated via the inter-communication processor interface 18 and via the aircraft's communication bus 50, as shown in FIG. 5. Thus, the signals are communicated via two different communication means. By sharing the data over both communication means, the correct signals can be determined even in the event of a fault condition on one of the communication means. Additionally, diagnostics may be implemented to detect when signals between the two mediums do not agree, and to determine which of the mediums is functioning normally. Such diagnostics may be implemented in the IB and/or OB channels, for example, or elsewhere in the aircraft's electronics.

Further, if one channel needs to change braking modes (e.g., from deceleration control to pressure control) due to sensor failure, it can be assured that all wheels are controlled under a common control strategy. This provides a robust system for the aircraft's brakes that cannot be achieved in systems employing a single communication means.

Accordingly, the brake controller 10 in accordance with the present invention ensures that braking forces applied by different brakes are relatively the same. In this manner, the brakes (and thus the wheels) share the entire braking load, without one providing significantly more effort than the others.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A brake controller for controlling one or more brakes of a vehicle and another one or more brakes of the vehicle, comprising:
    a first control channel for providing brake control signals to the one or more brakes;
    a second control channel for providing brake control signals to the another one or more brakes, wherein at least one of the first control channel and the second control channel is configured to act as an executive in monitoring braking efforts applied by the one or more brakes as compared to braking efforts applied by the another one or more brakes, wherein the control channel configured to act as the executive determines a correction factor and wherein the control channel configured to act as a non-executive causes the braking efforts of at least one of the one or more brakes or the another one or more brakes to be modified in accordance with the correction factor,
    wherein the first control channel comprises at least one of a first processor and a first memory, or a first hardware circuit,
    wherein the second control channel comprises at least one of a second processor and a second memory, or a second hardware circuit, and
    wherein the correction factor corresponds to a phasing of the one or more brakes and the another one or more brakes,
    wherein the one or more brakes is associated with an inner bank brake and the another one or more brakes is associated with an outer bank brake.

2. The brake controller according to claim 1, wherein the brake control signals are modified so as to equalize an applied braking force between the one or more brakes and the another one or more brakes.

3. The brake controller according to claim 2, wherein the control channel configured to act as the executive is operative to increase the brake control signal provided to one of the one or more brakes and the another one or more brakes, and to decrease the brake control signal provided to the other of the one or more brakes and the another one or more brakes.

4. The brake controller according to claim 1, wherein the brake control signals are modified so as to equalize a braking phase between the one or more brakes and the another one or more brakes.

5. The brake controller according to claim 4, wherein the control channel configured to act as the executive is operative to increase or decrease a brake timing signal provided to one of the one or more brakes and the another one or more brakes relative to a brake timing signal provided to the other of the one or more brakes and the another one or more brakes.

6. The brake controller according to claim 1, further comprising a first communication interface configured to exchange information between the first control channel and the second control channel.

7. The brake controller according to claim 6, further comprising a second communication interface configured to exchange information between devices external to the brake controller and at least one of the first or second control channel.

8. The brake controller according to claim 1, wherein the first control channel and the second control channel are independent of one another.

9. The brake controller according to claim 1, wherein the first control channel comprises a first controller that controls an operation of the one or more brakes, and the first control channel receives braking commands from a brake pedal.

10. The brake controller according to claim 9, wherein the second control channel comprises a second controller that controls an operation of the another one or more brakes, and the second control channel receives braking commands from the brake pedal.

11. The brake controller according to claim 10, wherein at least one of the first control channel and the second control channel is configured to modify the first and/or second brake control signals so as to cause the braking efforts of the one or more brakes and the another one or more brakes to equalize.

* * * * *

UNITED STATES PATENT AND TRADEMARK OFFICE
CERTIFICATE OF CORRECTION

| | | |
|---|---|---|
| PATENT NO. | : 10,737,669 B2 | Page 1 of 1 |
| APPLICATION NO. | : 15/945174 | |
| DATED | : August 11, 2020 | |
| INVENTOR(S) | : Eric D. Cahill | |

It is certified that error appears in the above-identified patent and that said Letters Patent is hereby corrected as shown below:

On the Title Page

Item (72) at the Inventor field: after Troy, please delete "MI" and insert --OH--

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*